United States Patent Office 3,143,577
Patented Aug. 4, 1964

3,143,577
PREPARATION OF A HALOGEN CONTAINING ORGANO-MAGNESIUM MATERIAL
Derek Bryce-Smith and Ernest Thomson Blues, Reading, England, assignors to National Research Development Corporation, London, England, a British corporation
No Drawing. Filed Apr. 27, 1960, Ser. No. 24,879
Claims priority, application Great Britain Apr. 29, 1959
5 Claims. (Cl. 260—665)

The present invention relates to organometallic materials and has as an object the provision of an improved method for the preparation of halogen containing organo-magnesium materials by the reaction of organic halides with magnesium. Even though the reaction of magnesium is achieved readily with a wide range of organic halides to yield halogen containing organo-magnesium materials of great synthetic versatility, the use of the reaction, except for laboratory purposes, has been avoided whenever possible.

As originally described by Grignard, the reaction is carried out in solution in diethyl ether which, because of its cost and hazardous character, and because of its strong affinity for the product, is an undesirable solvent for large scale work. The ether behaves as a powerful catalyst for the reaction, but even so, it is often preferred to use an iodide or bromide as the halide because of the lower reactivity and/or long induction periods of the much cheaper chlorides, this being especially so in the case of the aryl halides.

Various attempts have been made to prepare the halogen-containing magnesium derivatives in the absence of catalysts, or using catalysts other than diethyl ether e.g. tertiary amines or tetrahydrofuran (used as solvent as well as catalyst) but owing to the low yields obtained, the long reaction times involved, or other working difficulties and probably also to the conflicting nature of the reported results, it has remained accepted in the art that the use of an ether is essential for practical purposes.

In accordance with the present invention, there is provided a process for the preparation of a halogen containing organo-magnesium material, which process comprises contacting an aryl-, alkaryl-, aralkyl- or primary or secondary alkyl- saturated hydrocarbon mono-halide or a saturated alkoxyaryl monohalide and metallic magnesium together at elevated temperature in the presence of a dissolved organic oxide derivative of magnesium or aluminium, the amount of the derivative present in solution and the temperature being such that the derivative catalyses consumption of the halide by reaction with the magnesium to yield a halo-magnesium derivative of the halide as a reaction product which is stable in the reaction mixture. Organic oxide derivatives as used in the present process are found to give a catalytic effect on the reaction of magnesium with organic halides which is comparable with, and often greatly superior to, that obtained with diethyl ether as conventionally used and is greater than that obtained with tertiary amines even when used in higher concentration. They also give a greater catalytic effect than would be obtainable with tetrahydrofuran used as a catalyst in a similar molar proportion. The catalytic effect is in fact such that the use of bromides and iodides is rendered unnecessary, and reaction is obtained without difficulty even in the hitherto very difficult case of the aryl chlorides, for example, chlorobenzene. In the organic oxide derivatives, the metal replaces the hydrogen atom of an alcohol, phenolic or enolic hydroxyl group and the metal is accordingly linked to carbon via an oxygen atom.

The reaction may be carried out using the organic halide itself as the reaction medium in cases such as chlorobenzene where there is little tendency for a Wurtz type reaction, or it may be carried out in the presence of an inert diluent, preferably a hydrocarbon e.g. a paraffin fraction of convenient boiling range, isopropyl benzene, tetrahydronaphthalene, xylene, benzene or toluene. As will be appreciated the use of a diluent in this manner facilitates control of the rate of the reaction and permits more complete consumption of the halide. Obviously the use of those unsaturated hydrocarbons which would polymerise under the conditions of the reaction, should be avoided. The use of high boiling hydrocarbon solvents has the following advantages in comparison with the use of highly volatile ethers: (1) Lower cost. (2) Reduction of hazard from fire and peroxides. (3) Easier control of exothermic reactions. (4) Wider range of working temperatures, giving greater flexibility in synthetic reactions (up to 200° C. in certain cases).

With some combinations of halide and diluent the organic oxide derivative has a catalytic effect for side reactions as well as for the required reaction of the halide with the magnesium, and it has been observed that the side reactions sometimes tend to predominate when the derivative is used in small proportions. They are readily recognised however, and no difficulty is experienced in arranging the proportion of the derivative such that the required product is obtained in high yield.

The catalytic behaviour of the amount of organic oxide derivative employed is found to be dependent upon the number of metal-oxygen bonds which it provides. In most cases a convenient amount of the derivative is such as to provide from 0.5 to 10 equivalents percent of metal-oxygen bonds per mol of the halide. Where an aromatic solvent is employed as a reaction medium, it is preferable to avoid the lower part of this range e.g. below 5.0 equivalents percent.

Obviously, the choice of conditions for the reaction depends upon the nature of the halide and the reaction medium. Thus the most convenient reaction temperature varies from case to case, though it is readily found. With most halides it is within the range of from 30° to 200° C., usually from 70° to 140° C., when the organic oxide derivative is the only catalyst employed. Especially for halides with which the reaction is slow, the yield tends to be dependent upon the procedure adopted; for example, such halides are preferably added slowly to the reation mixture, otherwise the yield tends to be low.

The precise constitution of the organo-magnesium reagents prepared by the present procedure is not known; but it may be noted that the organo-magnesium solutions obtained generally contain considerably less halogen than is required for the formula RMgHal, thereby differing from the materials known generally as Grignard reagents.

The oxide derivative may be added as such to the reaction vessel, or it may be prepared therein either in a preliminary step or in the presence of the halide as desired. The metal in the organic oxide derivative may be the same as or different from that to be reacted with the halide. In one convenient form of the method of reacting magnesium with an organic halide in accordance with the invention, a small amount, e.g. a molar proportion of from 0.5% to 10% by weight based on the magnesium, of an alcohol or phenol is introduced into the reaction mixture, with a trace of an initiator e.g. iodine where required and the mixture is heated to form a magnesium alkoxide or a magnesium aroxy compound. When the alcohol or phenol has become consumed or excess thereof removed by distillation (distillation is not usually necessary in practice), a catalysed reaction between the halide and the excess magnesium remaining after the formation of the organic oxide derivative is initiated and thereafter proceeds rapidly to give a high yield of halogen containing organo-magnesium material based upon the amount of halide or magnesium consumed. A wide variety of alcohols and phenols may be employed; however some alcohols and phenols react more rapidly than others, and some indeed e.g. ethylene glycol, only react after a long induction period. Thus while very good results have been obtained using isopropyl alcohol and other secondary alcohols; primary alcohols such as methanol, ethanol, n-lauryl alcohol and benzyl alcohol; tertiary alcohols such as tert-butyl alcohol; diols such as ethylene glycol; cyclic alcohols such as tetrahydrofurfuryl alcohol; and unsaturated alcohols such as allyl alcohol or propargyl alcohol; all of which yield organic oxide derivatives with the magnesium; may also be employed.

With most alcohols, reaction with magnesium is normally initiated readily in the presence of a trace of a halogen e.g. iodine; but 2-methoxy and 2-ethoxy ethanol readily yield alkoxides with magnesium without such initiation, and their use is therefore particularly convenient for general work.

In a preferred form the invention is carried out by adding a trace of 2-ethoxy-(or methoxy)-ethanol, with or without iodine to an excess of magnesium (1.1 atom) suspended in a mixture of the halide (1.0 mol.) and a hydrocarbon preferably at a temperature in the range of from 50° to 180° C. The following advantages over existing procedures are obtained:

(1) No special drying of the materials is required since an adequate amount of alkoxide will destroy all water and an excess of alcohol may be provided for the reaction with the magnesium.

(2) Many hydrocarbons of commercial quality are effective as media without special purification.

(3) Even slightly air-tarnished magnesium may be used without disadvantage. The initial rapid reaction with the alcohol leaves a freshly etched metal surface which under the influence of the alkoxide catalyst, reacts at a suitable temperature even with alkyl and aryl monochlorides, without any observable induction period, giving high yields of the organo-magnesium derivative.

In addition to the above simple alcohols, phenols and ether alcohols, hydroxy compounds containing other functional groups also give alkoxides which are effective catalysts, e.g. diacetone alcohol and β-dimethylaminoethanol. Furthermore, various oxygen-containing substances which are not usually considered to contain hydroxyl groups are nevertheless capable of yielding organic oxide derivatives of metals and may consequently be used though naturally their catalytic activity varies; thus esters such as ethyl formate, ethyl acetate, ethyl benzoate, ethyl acetoacetate, diethyl malonate, diethyl carbonate, ketones such as acetone and aldehydes such as acetaldehyde are all effective when used in small proportions in conjunction with an elemental halogen, especially iodine: in the absence of an elemental halogen induction periods tend to be prolonged. In cases where the ester or the oxygen-containing substance tends to retard reaction of the magnesium with the halide, any excess may be removed by distillation to initiate a reaction.

It is to be noted that the organic oxide derivative need not be prepared directly from the metal itself but may be prepared indirectly via an organic derivative of the metal; e.g. a Grignard compound or organo-aluminum compound, as conventionally prepared, may be reacted with an alcohol, ketone, ester, aldehyde or epoxide. It is also to be noted that when an ester or other carbonyl compound, magnesium and the halide are heated together, there may initially be a low uncatalysed reaction between the halide and the magnesium, the product of which reacts with the carbonyl compound to give the catalyst.

Control experiments have shown that magnesium and aluminum alkoxides, for example aluminum isopropoxide, have little or no tendency to give ether by reaction with alkyl and aryl chlorides in the process. The sodium and potassium analogues have a slight tendency to form ethers with alkyl chlorides, but are less active as catalysts. Consequently, the powerful catalysis observed is not attributable to the formation of traces of ethers, or in the case of aluminium alkoxides to the formation of aluminium chlorides.

In order to illustrate the ease with which halogen containing organo-magnesium materials may be prepared using combinations of reactants and solvents which would hitherto have seemed impossible for the purpose, there may be mentioned the preparation of such a material from n-butyl chloride using toluene as a diluent. In the presence of magnesium, n-butyl chloride and toluene usually react very slowly to yield a hydrocarbon but the use of an organic oxide derivative, in accordance with the present invention, can suppress this reaction and a butyl-magnesium-chlorine derivative is obtained exclusively.

It is within the scope of the invention to carry out the reaction in the presence of additional substances which themselves have a catalytic effect on the reaction, e.g. aluminium chloride, or copper where desired. Thus the magnesium alkoxide derivative of triethanolamine is a rather weak catalyst for the reaction of chlorobenzene with magnesium, but is more active in conjunction with aluminium chloride. The use of large proportions of ether as an additional catalyst in this way should normally be avoided as ether tends to render magnesium and aluminium organic oxide derivatives insoluble in the reaction mixture.

However, in certain cases and especially with branched chain primary and secondary alkyl halides e.g. reactions of cyclohexyl chloride, secondary butyl chlorides, or benzyl chloride with magnesium in xylene catalysed by magnesium bis-(2-ethoxyethoxide), small proportions of diethyl ether 1,2-dimethoxyethane, tetrahydrofuran, N-methylmorpholine or dimethylaniline act as efficient co-catalysts, the combined catalytic effect being greater than the individual effects.

The amount of co-catalyst required is small; moreover it is unnecessary to introduce it in moisture free form as the catalyst dries it in situ without producing deleterious effects on the reaction.

The utility of ether or other co-catalyst for any particular case can be determined by simple experiment, regard being paid on the one hand to the desirability of reducing the working temperature and on the other hand to any undesirable effects which its presence may have on the reaction for which the organo-magnesium material is intended. For the reaction of magnesium with straight chain primary alkyl chlorides containing up to 18 carbon atoms, it may be noted that no co-catalyst is necessary, and excellent results are obtainable using the organic oxide derivative in an amount such as to provide about 5 equivalents of metal-oxygen bonds per mol of the chloride.

Sulphur containing materials act as anti-catalysts and sometimes (e.g. with carbon disulphide) as powerful anti-catalysts for the alkoxide-catalysed reactions of magnesium with organic halides and can be used to control an over-vigorous reaction.

Fortunately, sulphur containing materials present as contaminants in the starting materials—they are often present in commercial halides—can be removed by standing over calcium chloride if their presence is undesired.

The behaviour of the organo-magnesium materials prepared by the present method in organic synthesis is normally closely similar to that of conventional Grignard reagents prepared in ether. They may be used in a similar way to yield organic compounds containing the organic group of the halide, including compounds in which the organic group of the halide is obtained linked with a non-metal e.g. silicon or phosphorus or with a metal, such as aluminium, beryllium, tin or lead (e.g. by reaction with a suitable derivative such as a chloride alkoxy derivative or acetate). Some differences of behaviour are however encountered; for example materials prepared in the ether-free condition from alkyl halides can be employed to form trialkyl aluminium compounds in yields approaching 100% by reaction with aluminium chloride, whereas the conventional reagents yield organo-aluminium etherates wherein the ether is firmly bound and difficult to remove. Triphenyl aluminium and tetraphenyl tin are both obtainable in high yield. The former which has hitherto been an inconvenient substance to prepare, has been obtained for example in a yield of 94%.

For some syntheses it is found that reaction is favoured by the presence of ether. Examples are reactions of the material and non-metallic halides e.g. those of phosphorus, carbonyl compounds and epoxides and, generally, with substances which themselves tend to co-ordinate with the material, for all of which it is advantageous to add about one mol of ether per gram atom of magnesium present in the material. Although such addition of ether inflates the cost, and increases the hazards of the overall process, the overall process nevertheless remains superior, from both the economic and safety viewpoints, to processes in which ether is used as the solvent for the reaction with the magnesium metal. In the latter cases the ether is employed in substantially larger amounts and is present over a longer period.

In addition to their utility in syntheses the materials are especially, when free from ether, of remarkable utility in the polymerisation of vinyl monomers of the type normally susceptible to anionic polymerisation and mixtures thereof to form resinous polymers. Using them by themselves, excellent results have been obtained in the polymerisation of styrene, isoprene, butadiene, vinyl ethyl ether, methyl methacrylate, and acrylonitrile and in the copolymerisation of acrylonitrile with styrene. Using them with titanium tetrachloride, titanium trichloride or other heavy metal compounds adapted to yield catalysts of the Ziegler type, a high rate of polymerisation of olefins such as ethylene or propylene is obtained even at atmospheric pressure and room temperature. In the case of propylene the proportion of isotactic polymer produced is normally high, but varies with the nature of alkyl group, the nature of heavy metal halide (e.g. titanium trichloride gives greater stereospecificity than titanium tetrachloride), the temperature, and the physical form of the catalyst. Thus, with halogenated aromatic hydrocarbons such as chlorobenzene used as solvent a catalyst obtained from titanium tetrachloride tends to be soluble and the stereospecificity is low. The same catalyst used as a suspension in an aliphatic hydrocarbon medium gives relatively high stereospecificity.

As will be appreciated the relative proportions in which the organo-magnesium material and the heavy metal halide are used have an important influence on the efficiency of the catalyst. For a catalyst prepared from titanium tetrachloride, the appropriate ratio of Ti-Cl bonds provided by the titanium tetrachloride to the C-Mg bonds present is less than 1:1.

The use in polymerisation processes of conventional Grignard reagents prepared in ether has previously been proposed but the removal of the ether, which appears to exert a strong unfavourable effect on the polymerisation even when present in traces, has caused considerable difficulty, which is readily avoidable in accordance with the present invention. Traces of the organic oxide derivative used as the catalyst in the production of our material from magnesium do not adversely influence the polymerisation.

The following examples in which all references to percentages are to be taken as references to percentage by weight, are given in order to illustrate the invention.

*Example 1*

A mixture of magnesium (250 mesh powder; 2.62 grams), chlorobenzene (70 ml.) and isopropyl alcohol (0.6 gram) was heated with stirring under reflux for 5 minutes in a nitrogen atmosphere. Iodine (0.06 gram) was added. A vigorous reaction started almost immediately with evolution of hydrogen and after one hour at 130° C. no free magnesium remained. Yield of organo-magnesium material: 93% of theoretical. Reaction of a portion of the product with carbon dioxide gave benzoic acid in 90% yield.

An equivalent amount of the following alcohols used in place of the isopropyl alcohol gave the following yields: methyl alcohol 78%, ethyl alcohol 80%, tertiary butyl alcohol 88%, lauryl alcohol 93.5%, ethylene glycol 82%, phenol 92%, 2-ethoxy ethanol 89%, 2-methoxy ethanol 92%, "Trigol" (Shell) 92.5%, diacetonyl alcohol 90%. The methoxy- and ethoxy-ethanol needed no iodine to initiate reaction. They gave particularly active catalysts, the vigorous reaction of chlorobenzene with magnesium being complete within 20 minutes.

*Example 2*

A mixture of magnesium (250 mesh: 2.48 grams) chlorobenzene (70 ml.) and aluminium isopropoxide (0.68 gram) was heated in nitrogen under reflux with stirring. An exothermic reaction commenced after 8 minutes and was complete within 30 minutes. Yield of organo-magnesium material: 96%.

A control experiment showed that no aluminium chloride was formed under the foregoing conditions.

Stannic chloride (4.56 g.) was added dropwise to the organo-magnesium material over 30 minutes with refluxing, and heating under reflux was continued for 7 hours. Tetraphenyl tin, M.P. 225–226°, was isolated by conventional procedures. Yield of pure material 81% of theoretical.

To a further portion of organo-magnesium material prepared in the same way, aluminium chloride (4.6 g.) and chlorobenzene (35 ml.) were added with stirring under nitrogen at 100° C. The mixture became very pasty; toluene (35 ml.) was then added and the mixture was heated to 120° with stirring. Filtration gave triphenylaluminium (yield greater than 95% of the theoretical) in a solution almost completely free of magnesium and hydrolysable chlorine. For most purposes it is convenient to use this solution directly without isolation of the aluminium compound.

*Example 3*

A mixture of magnesium (250 mesh: 2.48 grams) chlorobenzene (70 ml.) and acetone (0.73 ml.) was heated under reflux under nitrogen for 10 minutes. Iodine (0.25 gram) was added to initiate a vigorous reaction which was complete in 40 minutes at the reflux temperature. Yield of organo-magnesium material: 90%.

*Example 4*

A mixture of magnesium (250 mesh: 3.22 grams), toluene (60 ml.) and 2-ethoxy ethanol (0.97 ml.) was heated under reflux until the initial brief reaction had ceased. n-Butyl chloride (10.46 ml.) was then added at 72° C. Vigorous reaction commenced without any induction period and the mixture refluxed without external heat for 15 minutes. Heating and stirring were applied for a further 15 minutes to ensure complete reaction. Yield of organo-magnesium material: 97%.

*Example 5*

A mixture of magnesium (250 mesh: 3.22 grams) n-butyl chloride (10.46 ml.), toluene (technical quality unpurified) (60 ml.) and aluminium isopropoxide (0.34 gram) was heated under gentle reflux under nitrogen. An exothermic reaction commenced within three minutes and was complete within 25 minutes. A 90% yield of butane was obtained after hydrolysis of the product.

*Example 6*

Ethyl chloride (6.45 g.) was passed during 15 minutes at 100° C. with stirring into magnesium powder (3.0 g.; grade 4) and aluminium isopropoxide (0.68 g.) in decahydronaphthalene (100 ml.). Reaction commenced almost immediately whene initiated by iodine (0.05 g.). The mixture was stirred at 100° C. for a further 30 minutes. A chlorine containing ethyl magnesium material was obtained in 80% of the theoretical yield. It was appreciably soluble in warm decahydronaphthalene especially when freshly prepared.

*Example 7*

Magnesium powder (1.7 g.) was covered with 10 ml. of a solution of diethyl ether (3.7 g.) in sulphur-free light petroleum (25 ml. B.P. 100 to 120°). The remainder of the ether solution was added to cyclohexyl chloride (5.93 g.) and 5 ml. of the resulting solution was added to the magnesium, followed by ethanol (0.23 g.). The mixture was heated to 60° C. with stirring, the reaction being initiated by a crystal of iodine (no stirring) at this temperature: no induction period. The remainder of the halide solution was added dropwise over 20 minutes. The temperature was kept below 70° C. and heating with stirring at 60 to 70° C. was maintained for a further 15 minutes after addition of the halide. The chlorine containing cyclohexyl-magnesium material obtained in the form of an etherate was only sparingly soluble in the reaction mixture, but could be brought into solution by the addition of more ether if required. Yield 75% of theoretical. Improved yields were obtainable at rather lower temperatures with slightly longer reaction periods. Other secondary chlorides such as sec.-butyl chloride gave similar results. With aralkyl chlorides such as benzyl chloride, tetrahydrofuran was more effective than diethyl ether as a co-catalyst.

*Example 8*

A phenylmagnesium material was prepared from magnesium (6 g. powder) in chlorobenzene (200 ml.) with isopropyl alcohol (1.2 g.), reaction being initiated by iodine. Titanium tetrachloride (25 ml. of a 5% w./v. solution in light petroleum) was added at 110° C. with vigorous stirring under nitrogen. Stirring was continued for 1 hour more at 110° C. No brown solid matter could be separated from the resulting brown-black solution by centrifugation. This solution when diluted with chlorobenzene was a powerful catalyst for the polymerisation of ethylene or propylene at 25° C. and atmospheric pressure to materials of high molecular weight. Addition of the catalyst solution to a considerable excess of a paraffinic medium such as light petroleum gave a suspension of a brown-black solid. The passage of ethylene or propylene into such a suspension gave a somewhat less rapid polymerisation to materials of high molecular weight, but with greatly improved stereospecificity in the case of propylene. The use of titanium trichloride in place of titanium tetrachloride also gave catalysts effective for the polymerisation of ethylene or propylene.

*Example 9*

A butylmagnesium material was prepared as in Example 4, but using light petroleum (B.P. 100 to 120°) and isopropanol in place of toluene and 2-ethoxy ethanol respectively. 10 ml. of the resulting stirred material in light petroleum was added to a solution of methyl methacrylate in light petroleum (25 ml. of a 25% solution at −20° C.). After 1 hour of stirring at this temperature, the polymer was isolated as a hard glassy substance. Working as above, but at 20° C. and at varying dilutions as necessary, styrene, vinyl ethers such as ethyl vinyl ether, vinyl carboxylates such as vinyl acetate, conjugated unsaturated nitriles such as acrylonitrile, readily give polymeric materials of high molecular weight.

The foregoing examples illustrate the ease with which halogen-containing organo-magnesium materials are obtainable in accordance with the invention. Obviously the procedures described therein may be modified, and/or applied to halides other than those specially mentioned, to suit particular circumstances and continuous flow methods may be adopted where considered advantageous, the organic oxide derivative being formed in situ in an auxiliary reactor, or fed from stock according to choice.

Good results are obtainable using, for example, p-chlorotoluene, p-chloro anisole, a chloronaphthalene or isobutyl chloride as the halide. With benzyl chloride and secondary alkyl chlorides in general, and branched chain primary alkyl chlorides, it is usually advantageous to use a co-catalyst e.g. as in Example 7.

We claim:

1. A process for the preparation of a halogen containing organo-magnesium material which process comprises contacting an organic halide selected from the class consisting of aryl-, alkaryl-, aralkyl- and primary and secondary alkyl- saturated hydrocarbon monohalides and saturated alkoxyaryl monohalides and metallic magnesium together in the presence of a metal alcoholate selected from the class consisting of magnesium and aluminum alcoholates of an alcohol selected from the group consisting of methanol, ethanol, isopropanol, tertiary butanol, lauryl alcohol, ethylene glycol, phenol, 2-ethoxy ethanol, 2-methoxy ethanol and diacetonyl alcohol, the amount of alcoholate present in the solution and the temperature being such that the alcoholate catalyses consumption of the halide by reaction with the magnesium to yield a halo-magnesium derivative of the halide as a reaction product which is stable in the reaction mixture.

2. A process for the preparation of a halogen containing organo-magnesium material which process comprises contacting an organic halide selected from the class consisting of aryl-, alkaryl-, aralkyl- and primary and secondary alkyl- saturated hydrocarbon monohalides and saturated alkoxyaryl monohalides and metallic magnesium together in the presence of magnesium isopropoxide, the amount of the isopropoxide present in the solution and the temperature being such that the isopropoxide catalyses consumption of the halide by reaction with the magnesium to yield a halo-magnesium derivative of the halide as a reaction product which is stable in the reaction mixture.

3. A process for the preparation of a halogen containing organo-magnesium material which process comprises contacting an organic halide selected from the class consisting of aryl-, alkaryl-, aralkyl- and primary and secondary alkyl- saturated hydrocarbon monohalides and saturated alkoxyaryl monohalides and metallic magnesium together in the presence of magnesium ethoxide, the amount of the ethoxide present in the solution and the temperature being such that the ethoxide catalyses consumption of the halide by reaction with the magnesium to yield a halo-magnesium derivative of the halide as a reaction product which is stable in the reaction mixture.

4. A process for the preparation of a halogen containing organo-magnesium material which process comprises contacting an organic halide selected from the class consisting of aryl-, alkaryl-, aralkyl- and primary and secondary alkyl- saturated hydrocarbon monohalides and saturated alkoxyaryl monohalides and metallic magnesium together in the presence of magnesium 2-ethoxy ethoxide, the amount of the 2-ethoxy ethoxide present in the solution and the temperature being such that the 2-ethoxy ethoxide catalyses consumption of the halide by reaction with the magnesium to yield a halo-magnesium derivative of the halide as a reaction product which is stable in the reaction mixture.

5. A process for the preparation of a halogen containing organo-magnesium material which comprises contacting an organic halide selected from the class consisting of aryl-, alkaryl, aralkyl and primary and secondary alkyl- saturated hydrocarbon monohalides and metallic magnesium together in the presence of aluminium isopropoxide, the amount of aluminium isopropoxide and the temperature being such that the aluminium isopropoxide catalyses consumption of the halide by reaction with the magnesium to yield a halo-magnesium derivative of the halide as a reaction product which is stable in the reaction mixture.

(References on following page)

References Cited in the file of this patent

UNITED STATES PATENTS

| | | |
|---|---|---|
| 2,838,508 | Ramsden | June 10, 1958 |
| 2,886,561 | Reynolds et al. | May 12, 1959 |
| 2,938,932 | Normant | May 31, 1960 |
| 2,943,115 | Normant | June 28, 1960 |

OTHER REFERENCES

"Grignard Reactions of Non Metallic Substances" Kharasch et al., page 11.

Metal-Organic Compounds, page 11, American Chemical Soc., Washington, D.C.